(12) United States Patent
Hannuksela et al.

(10) Patent No.: US 9,398,313 B2
(45) Date of Patent: Jul. 19, 2016

(54) DEPTH MAP CODING

(75) Inventors: Miska Matias Hannuksela, Ruutana (FI); Dmytro Rusanovskyy, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 767 days.

(21) Appl. No.: 13/339,722

(22) Filed: Dec. 29, 2011

(65) Prior Publication Data

US 2013/0002816 A1 Jan. 3, 2013

Related U.S. Application Data

(60) Provisional application No. 61/427,843, filed on Dec. 29, 2010.

(51) Int. Cl.
*H04N 7/18* (2006.01)
*H04N 19/82* (2014.01)
*H04N 19/597* (2014.01)
*H04N 19/50* (2014.01)
*H04N 19/117* (2014.01)
*G06T 9/00* (2006.01)

(52) U.S. Cl.
CPC ........ *H04N 19/82* (2014.11); *G06T 9/00* (2013.01); *H04N 19/117* (2014.11); *H04N 19/50* (2014.11); *H04N 19/597* (2014.11)

(58) Field of Classification Search
CPC . H04N 7/26888; H04N 7/26058; H04N 7/50; H04N 19/00066; H04N 19/00903
USPC .................................................... 375/240.29
See application file for complete search history.

(56) References Cited

U.S. PATENT DOCUMENTS

| 2009/0103616 | A1* | 4/2009 | Ho et al. .................. 375/240.12 |
| 2009/0290637 | A1* | 11/2009 | Lai et al. .................. 375/240.02 |
| 2010/0215251 | A1* | 8/2010 | Klein Gunnewiek et al. ............................. 382/154 |
| 2011/0090959 | A1* | 4/2011 | Wiegand et al. ......... 375/240.12 |

FOREIGN PATENT DOCUMENTS

| EP | 2059053 A2 | 5/2009 |
| WO | 2007/020570 A2 | 2/2007 |
| WO | 2009/127231 A1 | 10/2009 |

(Continued)

OTHER PUBLICATIONS

Merkle, P. et al., Efficient Compression of Multi-View Depth Data Based on MVC, 3DTV Conference, 2007, pp. 1,4, May 7-9, 2007.*

(Continued)

*Primary Examiner* — Andy Rao
(74) *Attorney, Agent, or Firm* — Alston & Bird LLP

(57) ABSTRACT

The invention relates to coding of depth information for multi-view video coding. Different parameters and/or any features from picture encoding or the encoded and reconstructed pictures may be used in the coding of the depth information, especially in filtering the depth picture using e.g. a loop filter in the depth coding loop. The same principle may be applied in decoding, that is, the decoded (texture) pictures and parameters may be used to control the decoding of the depth data, e.g. to control the filtering of the depth data in a loop filter. Parameters and data that may be used as such control may comprise features extracted from the reconstructed pictures, the encoded video data and parameters, the motion estimation data and others.

29 Claims, 6 Drawing Sheets

(56) References Cited

FOREIGN PATENT DOCUMENTS

| WO | WO 2009127231 A1 * | 10/2009 |
|---|---|---|
| WO | 2011/046607 A2 | 4/2011 |
| WO | 2011/118435 A1 | 9/2011 |
| WO | 2012/016168 A2 | 2/2012 |

OTHER PUBLICATIONS

Vetro et al., "Towards a 3D Video Format for Auto-Stereoscopic Displays", SPIE Conference on Applications of Digital Image Processing XXXI, Sep. 2008, pp. 1-11.

Scharstein et al., "A Taxonomy and Evaluation of Dense Two-Frame Stereo Correspondence Algorithms", International Journal of Computer Vision, vol. 47(1/2/3), 2002, pp. 7-42.

Zhu et al., "Fusion of Time-of-Flight Depth and Stereo for High Accuracy Depth Maps", IEEE Conference on Computer Vision and Pattern Recognition, Jun. 23-28, 2008, pp. 1-8.

Merkle et al., "The Effects of Multiview Depth Video Compression on Multiview Rendering", Signal Processing: Image Communication 24, 2009, pp. 73-88.

Ekmekcioglu et al., "Edge and Motion-Adaptive Median Filtering for Multi-View Depth Map Enhancement", Picture Coding Symposium, May 6-8, 2009, pp. 1-4.

Katkovnik, "A New Method for Varying Adaptive Bandwidth Selection", IEEE Transactions on Signal Processing, vol. 47, No. 9, Sep. 1999, pp. 2567-2571.

Smirnov et al., "Methods for Restoration of Compressed Depth Maps: A Comparative Study", The International Workshop on Video Processing and Quality Metrics for Consumer Electronics, 2009, pp. 1-6.

Katkovnik et al., "Directional Varying Scale Approximations for Anisotropic Signal Processing", Proceedings of XII European Signal Processing Conference, Sep. 2004, pp. 101-104.

Guleryuz, "A Nonlinear Loop Filter for Quantization Noise Removal in Hybrid Video Compression", IEEE International Conference on Image Processing, vol. 2, Sep. 11-14, 2005, pp. 333-336.

List et al., "Adaptive Deblocking Filter", IEEE Transactions on Circuits and Systems for Video Technology, vol. 13, No. 7, Jul. 2003, pp. 614-619.

Jovanov et al., "Content Adaptive Wavelet Based Method for Joint Denoising of Depth and Luminance Images", Proceedings of the SPIE on Wavelet Applications in Industrial Processing, vol. 6763, Sep. 9-12, 2007, pp. 1-8.

Goldenshluger et al., "On Spatial Adaptive Estimation of Nonparametric Regression", Math. Meth. Statistics, vol. 6, 1997, pp. 135-170.

Chiu, "Fuzzy Model Identification Based on Cluster Estimation", Journal of Intelligent and Fuzzy Systems, vol. 2, 1994, pp. 267-278.

Smolic et al., "3D Video and Free Viewpoint Video—Technologies, Applications and MPEG Standards", IEEE International Conference on Multimedia and Expo, Jul. 9-12, 2006, pp. 2161-2164.

Ince et. al, "Depth Estimation for View Synthesis in Multiview Video Coding", 3DTV Conference, Mitsubishi Electric Research Laboratories, TR2007-025, Jun. 2007, pp. 1-6.

International Search Report received for corresponding Patent Cooperation Treaty Application No. PCT/IB2011/056021, dated Apr. 11, 2012, 15 pages.

Bici, O, et al., *Planar Representation for Intra Coding of Depth Maps*, 3DTV Conference: the True Vision—Capture, Transmission and Display of 3D Video (3DTV-CON) IEEE (2011), 4 pages.

Fehn, C., *Depth-Image-Based Rendering (DIBR), Compression and Transmission for a New Approach on 3D-TV*, in Proc. SPIE Stereoscopic Displays and Virtual Reality Systems XI (2004) 93-104.

Ganwal, O P et al., *Depth Map Post-Processing for 3D-TV*, Consumer Electronics, 2009, ICCE '09. Digest of Technical Papers International Cofnerence on, Jan. 10, 2009, IEEE, Piscataway, NJ, USA, 2 pages.

Ince, S. et al., *Depth Estimation for View Synthesis in Multiview Video Coding*, 3DTV Conference, 2007, May 1, 2007, IEE, Pi.

Shapiro, L. G. et al., *Computer Vision*, Prentice-Hall, ISBN 0-13-030796-3 (2001) pp. 279-325.

Zhang, Q. et al., *An Improved Depth Map Estimation for Coding and View Syntheis*, Image Processing (ICIP), 2011 18$^{th}$ IEEE International Conerence on, Sep. 11, 2011 (2011) 2101-2104.

Zhang, Q. et a., *Reduced Resolution Depth Compression for Multiview Video Plus Depth Coding*, Signal Processing (ICSP), 2010 IEEE 10$^{th}$ International Conference on, Jan. 24, 2010, IEEE, Piscataway, NJ, USA (2010) 1145-1148.

* cited by examiner

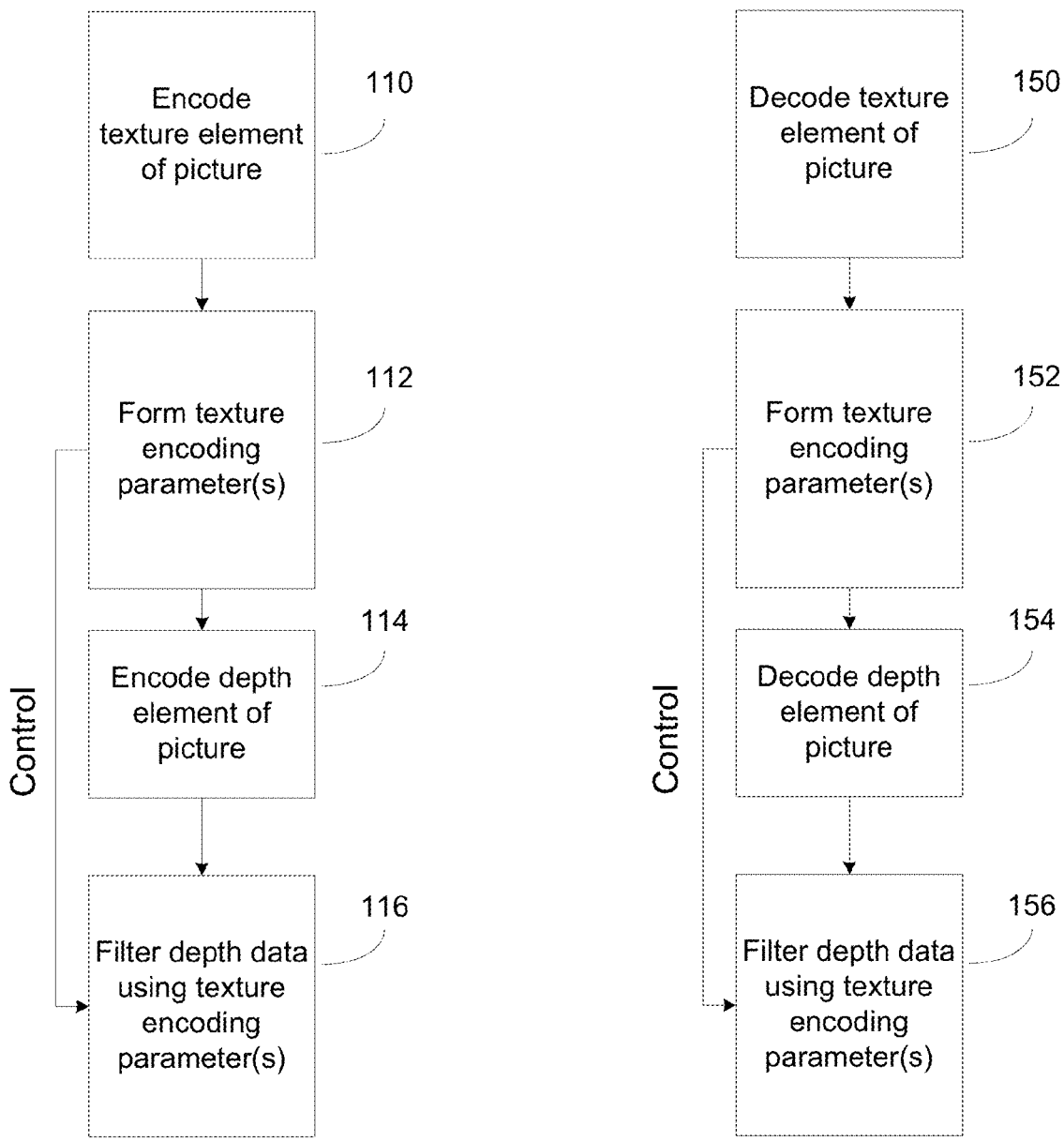

DEPTH MAP CODING

RELATED APPLICATION

This patent application claims priority under 35 U.S.C. §119(e) from U.S. Provisional Patent Application No. 61/427,843, filed Dec. 29, 2010, the disclosure of which is incorporated by reference herein in its entirety.

BACKGROUND

Advances in digital video coding have enabled the adoption of video into personal communication such as video telephony over mobile communication networks, capture and sharing of personal digital videos and consumption of video content available in internet services. At the same time, perhaps the most significant breakthrough since the addition of color into moving pictures is happening: moving pictures can be viewed in three dimensions, and from different viewing angles. Again, digital video coding is enabling the adoption of this technology into personal, widespread use.

The Advanced Video Coding (H.264/AVC) standard is widely used through digital video application domains. A multi-view extension, known as Multi-view Video Coding (MVC), has been standardized as an annex to H.264/AVC. The base view of MVC bitstreams can be decoded by any H.264/AVC decoder, which facilitates introduction of stereoscopic and multi-view content into existing services. MVC allows inter-view prediction, which can result in bitrate savings compared to independent coding of all views, depending on how correlated the adjacent views are.

As multi-view video coding is becoming more popular and its applications are increasing, there is a need for solutions that further improve the efficiency and quality of multi-view video coding.

SUMMARY

Now there has been invented an improved method and technical equipment implementing the method, by which the above problems are alleviated. Various aspects of the invention include a method, an apparatus, a server, a client and a non-transitory computer readable medium comprising a computer program stored therein, which are characterized by what is stated in the independent claims. Various embodiments of the invention are disclosed in the dependent claims.

To enable the use of multi-view video e.g. three-dimensional (3D) videos in devices of different size and viewing distance, the views of the video may be adjusted. For this purpose, the video bitstream may comprise or be complemented with depth information associated with the pictures of the video. The depth information may be coded with a video coding loop such as the H.264/AVC video coding loop, since such encoding may be most easily arranged, or with any other coding means. The video encoder encoding the (texture) pictures of the different views generates different parameters and encoded video data, and in the encoding, also decodes and reconstructs the pictures for later use as reference pictures. Different parameters and/or any features from the encoding or the encoded and reconstructed pictures may be used in the coding of the depth information, especially in filtering the depth picture using e.g. a loop filter in the depth coding loop. The same principle may be applied in decoding, that is, the decoded (texture) pictures and parameters may be used to control the decoding of the depth data, e.g. to control the filtering of the depth data in a loop filter. Parameters and data that may be used as such control may comprise features extracted from the reconstructed pictures, the encoded video data and parameters, the motion estimation data and others.

According to a first aspect there is provided a method for encoding picture data, the method comprising encoding at least one texture element of said picture data to obtain at least one encoded texture element, forming at least one texture encoding parameter in said encoding, encoding at least one depth element related to said at least one texture element to obtain at least one encoded depth element, applying filtering to depth data in said encoding of at least one depth element, and controlling said filtering using said at least one texture encoding parameter.

According to an embodiment, the method comprises encoding said at least one texture element in a texture coding loop, encoding said at least one depth element in a depth coding loop, applying said filtering to depth data in a loop filter of said depth coding loop, and forming said coded texture element and said coded depth element into at least one bitstream. According to an embodiment, the method comprises reconstructing encoded depth data of at least one other depth element, and using said reconstructed depth data as a prediction source in encoding of said at least one depth element. According to an embodiment, the method comprises reconstructing at least one part of an image using said at least one encoded texture element, extracting a feature from said at least part of an image using image feature extraction, and controlling said filtering using said feature. According to an embodiment, the at least one texture encoding parameter is indicative of at least one of the group of an encoding process, a filtering process, a prediction process, a transform process, a quantization process, a feature of a picture, a coded texture element and a non-coded texture element. According to an embodiment, the method comprises increasing a sample count of the at least one depth element by resampling in said filtering to obtain at least one upsampled depth element, and encoding said at least one upsampled depth element to obtain at least one encoded depth element.

According to a second aspect, there is provided an apparatus comprising at least one processor, memory including computer program code, the memory and the computer program code configured to, with the at least one processor, cause the apparatus to encode at least one texture element of said picture data to obtain at least one encoded texture element, form at least one texture encoding parameter in said encoding, encode at least one depth element related to said texture element to obtain at least one encoded depth element, apply filtering to depth data in said encoding of at least one depth element, and control said filtering using said at least one texture encoding parameter.

According to an embodiment, the apparatus comprises computer program code configured to, with the at least one processor, cause the apparatus to encode said at least one texture element in a texture coding loop, encode said at least one depth element in a depth coding loop, apply said filtering to depth data in a loop filter of said depth coding loop, and form said coded texture element and said coded depth element into at least one bitstream. According to an embodiment, the apparatus comprises computer program code configured to, with the at least one processor, cause the apparatus to reconstruct encoded depth data of at least one other depth element, and use said reconstructed depth data as a prediction source in encoding of said at least one depth element. According to an embodiment, the apparatus comprises computer program code configured to, with the at least one processor, cause the apparatus to reconstruct at least part of an image using said at least one encoded texture element, extract a feature from said at least part of an image using image feature extraction, and control said filtering using said feature. According to an embodiment, the at least one texture encoding parameter is indicative of at least one of the group of an encoding process, a filtering process, a prediction process, a transform process, a quantization process, a feature of a picture, a coded texture element and a non-coded texture element. According to an embodiment, the apparatus comprises computer program code configured to, with the at least one processor, cause the apparatus to increase a sample count of the at least one depth element by resampling in said filtering to obtain at least one upsampled depth element, and encode said at least one upsampled depth element to obtain at least one encoded depth element.

According to a third aspect, there is provided a method for decoding encoded depth data, the method comprising decoding at least one encoded texture element from encoded texture data, forming at least one texture encoding parameter in said decoding, decoding at least one depth element related to said at least one texture element from said encoded depth data to obtain at least one decoded depth element, applying filtering to said at least one decoded depth element in said decoding of at least one depth element, and controlling said filtering using said at least one texture encoding parameter.

According to an embodiment, the method comprises receiving said encoded texture data and said encoded depth data in at least one bitstream, decoding said at least one texture element in a texture coding loop, decoding said at least one depth element in a depth coding loop, and applying said filtering to said depth element in a loop filter of said depth coding loop. According to an embodiment, the method comprises reconstructing encoded depth data of at least one other depth element, and using said reconstructed depth data as a prediction source in decoding of said at least one depth element. According to an embodiment, the method comprises reconstructing at least part of an image using said at least one texture element, extracting a feature from said at least part of an image using image feature extraction, and controlling said filtering using said feature. According to an embodiment, the at least one texture encoding parameter is indicative of at least one of the group of a decoding process, a filtering process, a prediction process, a transform process, a quantization process, a feature of a picture, a coded texture element and a non-coded texture element. According to an embodiment, the method comprises increasing a sample count of at least one depth element by resampling in said filtering to obtain at least one upsampled depth element.

According to a fourth aspect there is provided an apparatus comprising at least one processor, memory including computer program code, the memory and the computer program code configured to, with the at least one processor, cause the apparatus to decode at least one encoded texture element from encoded texture data, form at least one texture encoding parameter in said decoding, decode at least one depth element related to said at least one texture element from said encoded depth data to obtain at least one decoded depth element, filter said at least one decoded depth element in said decoding of at least one depth element, and control said filtering using said at least one texture encoding parameter.

According to an embodiment, the apparatus comprises computer program code configured to, with the at least one processor, cause the apparatus to receive said encoded texture data and said encoded depth data in at least one bitstream, decode said at least one texture element in a texture coding loop, decode said at least one depth element in a depth coding loop, and apply said filtering to said depth element in a loop filter of said depth coding loop. According to an embodiment, the apparatus comprises computer program code configured to, with the at least one processor, cause the apparatus to reconstruct encoded depth data of at least one other depth element, and use said reconstructed depth data as a prediction source in decoding of said at least one depth element. According to an embodiment, the apparatus comprises computer program code configured to, with the at least one processor, cause the apparatus to reconstruct at least part of an image using said at least one texture element, extract a feature from said at least part of an image using image feature extraction, and control said filtering using said feature. According to an embodiment, the at least one texture encoding parameter is indicative of at least one of the group of an encoding process, a filtering process, a prediction process, a transform process, a quantization process, a feature of a picture, a coded texture element and a non-coded texture element. According to an embodiment, the apparatus comprises computer program code configured to, with the at least one processor, cause the apparatus to increase a sample count of at least one depth element by resampling in said filtering to obtain at least one upsampled depth element.

According to a fifth aspect there is provided a method for coding picture data, the method comprising coding at least one texture element of said picture data, forming at least one texture coding parameter in said coding, coding at least one depth element related to said at least one texture element, applying filtering to depth data in said coding of at least one depth element, and controlling said filtering using said at least one texture coding parameter.

According to a sixth aspect there is provided a computer program embodied on a non-transitory computer readable medium, the computer program comprising instructions causing, when executed on at least one processor, at least one apparatus to code at least one texture element of said picture data, form at least one texture coding parameter in said coding, code at least one depth element related to said at least one texture element, apply filtering to depth data in said coding of at least one depth element, and control said filtering using said at least one texture coding parameter.

According to a seventh aspect there is provided a system comprising at least one processor, memory including computer program code, the memory and the computer program code configured to, with the at least one processor, cause the system to at least code at least one texture element of said picture data, form at least one texture coding parameter in said coding, code at least one depth element related to said at least one texture element, apply filtering to depth data in said coding of at least one depth element, and control said filtering using said at least one texture coding parameter.

According to an eighth aspect there is provided apparatus comprising means for encoding at least one texture element of said picture data to obtain at least one encoded texture element, means for forming at least one texture encoding parameter in said encoding, means for encoding at least one depth element related to said texture element to obtain at least one encoded depth element, means for filtering depth data in said encoding of at least one depth element, and means for controlling said filtering using said at least one texture encoding parameter.

According to a ninth aspect there is provided an apparatus comprising means for decoding at least one encoded texture element from encoded texture data, means for forming at least one texture encoding parameter in said decoding, means for decoding at least one depth element related to said at least one texture element from said encoded depth data to obtain at least one decoded depth element, means for filtering said at least one decoded depth element in said decoding of at least one depth element, and means for controlling said filtering using said at least one texture encoding parameter.

In the above aspects, various combinations of the embodiments are possible, for example the first filtering embodiments may be combined with the loop filter embodiments, the prediction embodiments, the feature extraction embodiments, the various texture encoding parameter embodiments, and the resampling embodiments. The loop filter embodiments may be combined with the prediction embodiments, the feature extraction embodiments, the various texture encoding parameter embodiments, and the resampling embodiments. The prediction embodiments may be combined with the feature extraction embodiments, the various texture encoding parameter embodiments, and the resampling embodiments. The feature extraction embodiments may be combined with the various texture encoding parameter embodiments, and the resampling embodiments. The various texture encoding parameter embodiments may be combined with the resampling embodiments. In the combining of the embodiments, some elements may be modified or left out, and some elements described later in the description may be added. More than two embodiments may be combined, too. For example, various filter types may be used, as described.

DESCRIPTION OF THE DRAWINGS

In the following, various embodiments of the invention will be described in more detail with reference to the appended drawings, in which FIGS. 1a and 1b show flow charts for methods for encoding and decoding of depth information for multi-view video according to an embodiment;

DETAILED DESCRIPTION OF THE EMBODIMENTS

Figure 2A:
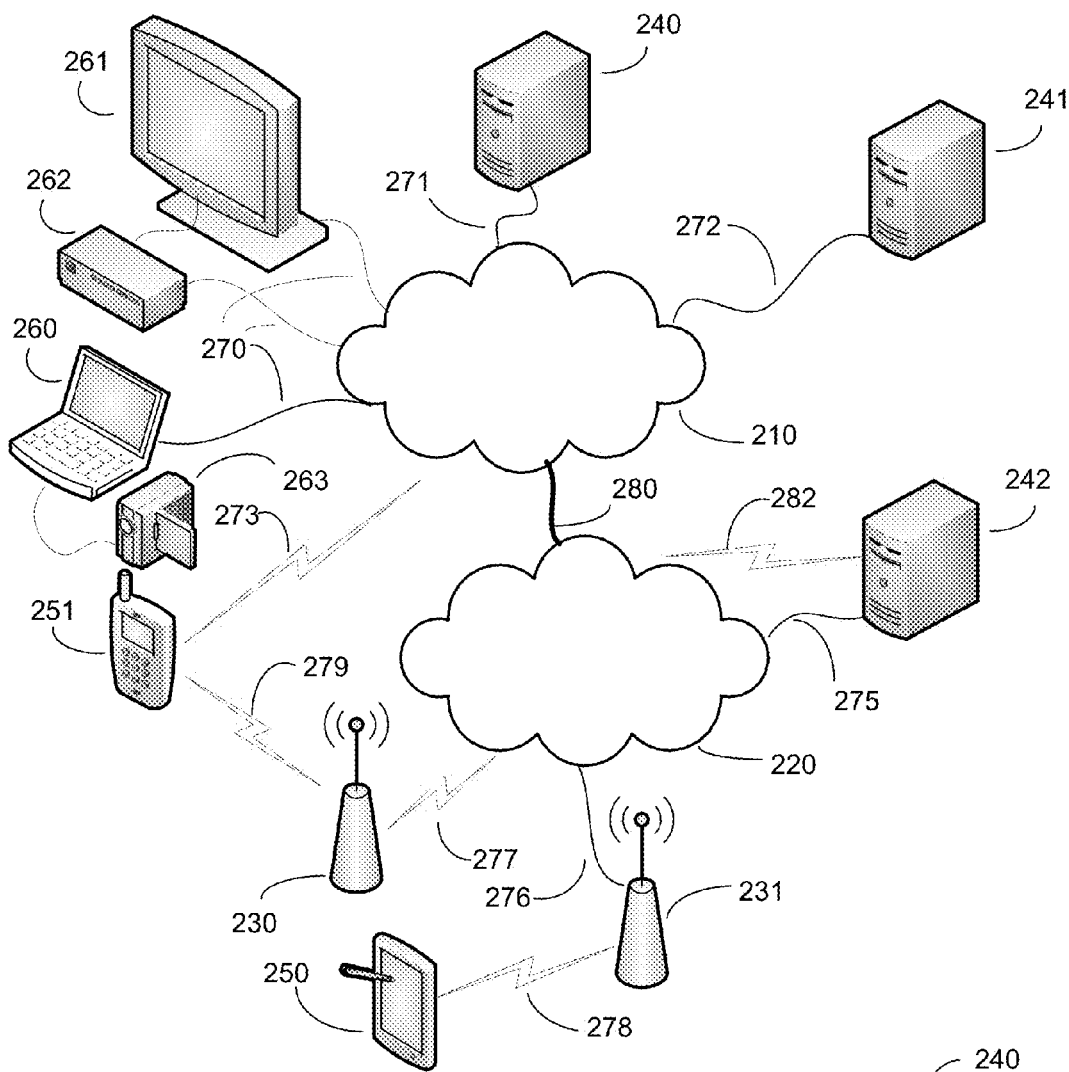
FIGS. 2a and 2b show a system and devices for encoding and decoding depth information in a multi-view video system according to an embodiment.

In the following, several embodiments of the invention will be described in the context of multi-view video coding and/or 3D video. It is to be noted, however, that the invention is not limited to multi-view video coding only. In fact, the different embodiments may have applications in any environment where coding of depth data related to a picture is required. For example, the invention may be applicable to single-view video and depth coding. Various embodiments described below relate generally to image and video processing. The various embodiments relate to processing and/or filtering of the depth video data on the basis of textural video data in depth-enhanced stereo/3D video formats and systems.

Stereoscopic and multiview displays differ in characteristics and typical viewing distances. It has been noticed here that the depth or disparity range in a coded bitstream may not match a comfortable depth range on a particular viewing device and for a particular user. It has been noticed here that a multiview video format would therefore advantageously enable real-time adjustment of the disparity between decoded views. In practice, one or more views may have to be synthesized from the coded views for these purposes.

To enable view adjustment through synthesis, depth, i.e. the distance from the camera to the corresponding texture pixels, may be derived at the encoder. Depth pictures may then be encoded along with the texture pictures. At the decoder, methods based on depth-image based rendering (DIBR) may be used for view synthesis.

Depth-enhanced video refers to texture video having one or more views associated with depth video having one or more depth views. A number of approaches may be used for coding of depth-enhanced video, including the use of video plus depth (V+D), multiview video plus depth (MVD), and layered depth video (LDV). The depth map video stream for a single view may be regarded as a regular monochromatic video stream and coded with any video codec. The essential characteristics of the depth map stream, such as the minimum and maximum depth in world coordinates, can be indicated in messages formatted according to the MPEG-C Part 3 standard. In the video plus depth (V+D) representation, the depth picture sequence may be coded independently with any video codec, such as H.264/AVC, or included as auxiliary pictures within the same video bitstream as the texture video. In the MVD representation, the depth picture sequence for each texture view is coded with any video codec, such as MVC. In the LDV representation, the texture and depth of the central view are coded conventionally, while the texture and depth of the other views are partially represented and cover only the dis-occluded areas required for correct view synthesis of intermediate views.

In so-called depth-enhanced video systems, available textural video data is augmented with per-pixel depth information. This approach is targeted for 3D video delivery applications, where textural and depth video data is compressed and transmitted to the users, whose decoder and/or display performs the parallax adjustments.

FIGS. 1a and 1b show flow charts for methods for encoding and decoding of depth information for multi-view video according to an embodiment. In FIG. 1a, the encoding of depth information is shown. The encoding starts by encoding a texture element of a picture in phase 110, that is, the encoding of regular picture information for example with a video coding loop. Any type of video coding may be used, for example H.264/AVC, and the encoding of picture (texture) information may happen in elements such as video blocks, slices, pixels, parts of pictures like macroblocks, groups of blocks or objects, and whole pictures. The video coding may comprise a video coding loop where e.g. motion prediction is performed. For this purpose, the encoder may store reference pictures to be used in motion prediction. In phase 112, the encoder forms various types of data such as transform coefficients and motion vectors, and various parameters such as picture or slice identifiers and different header information. Some of these data and parameters may be packetized and sent to a decoder, while some others may be used only internally in the encoder.

In phase 114, depth elements of the picture are encoded. The depth elements may have been formed by time-of-flight measurements during the recording of the video data, or alternatively or in addition, the depth information may have been formed from the multiple views of the video. For animations and other at least partially synthetically created video sequences, the depth elements may have been formed based on the information of the three-dimensional scene being represented by the video sequence and available at the creation of the video sequence in digital format. Other methods for obtaining the depth elements may also be used. The depth data may be in the form of one or more two-dimensional "grayscale" pictures. The depth pictures may be composed of blocks and pixels. The encoding of the depth picture may happen in a video coding loop e.g. similar to a H.264/AVC video coding loop, or another kind of a coding loop based on some sort of prediction. The depth picture encoding loop may be identical to the texture picture coding loop. In phase 116, a depth element may be filtered based on the texture encoding parameters formed in phase 112. The filtering may happen before encoding, after encoding or inside the encoding loop e.g. in a loop filter. The filtering may be carried out to smooth and correct depth information so that it corresponds better to the actual or appropriate depth information associated with the texture pictures. In other words, the original depth data may comprise discontinuities or other artifacts that do not have a correspondence in the real world, and filtering out these discontinuities or artifacts may produce a more realistic depth image.

A coding loop may be understood to comprise any feedback loop that utilizes earlier information on the picture in predicting subsequent information on the picture in coding order or a subsequent picture in coding order and then e.g. encodes only the difference between the subsequent information and the prediction. For example, that a first (e.g. filtered and decoded) depth element may be used in encoding of a second depth element as a source for prediction of the second depth element. The prediction may be intra prediction, inter prediction, inter-view prediction, inter-layer prediction, or other. Intra prediction may refer to a prediction derived from the decoded samples of the same decoded picture. Inter prediction may refer to a prediction derived from decoded samples of reference pictures other than the current decoded picture. Inter-view prediction may refer to a prediction derived from decoded samples of another view component in the same access unit that also comprises the current view component. A view component may refer to a coded representation of a view in a single access unit. Inter-layer prediction may refer to a prediction derived from syntax elements, derived variables, or decoded samples of the reference layer representation. A layer representation may refer to a subset of coded data within an access unit that are associated with a particular scalability layer, such as a particular coarse and medium grain scalability layer indicated by the same values of the dependency_id and quality_id syntax elements. Coding loops may be used in encoders and in decoders, and often the coding loops in an encoder and a corresponding decoder are similar or almost similar to ensure proper decoding of the encoded pictures. A coding loop in the decoder may also be referred to as a decoding loop.

In FIG. 1b, the decoding of depth information is shown. The decoding starts by decoding a texture element of a picture in phase 150, that is, the decoding of regular picture information for example with a video coding loop. Any type of video coding may be used, for example H.264/AVC, and the decoding of picture (texture) information may happen in elements such as video blocks, slices, pixels, parts of pictures like macroblocks, groups of blocks or objects, and whole pictures. The video decoding may comprise a video coding loop where e.g. motion prediction is performed. For this purpose, the decoder may store decoded reference pictures to be used in motion prediction. In phase 152, the decoder decodes various types of data such as transform coefficients and motion vectors, and various parameters such as picture or slice identifiers and different header information.

In phase 154, depth elements of the picture are decoded. The depth data may be in the form of one or more encoded two-dimensional "grayscale" pictures. The encoded depth pictures may be composed of blocks and pixels. The decoding of the depth picture may happen in a video decoding loop e.g. similar to a H.264/AVC video decoding loop, or another kind of a decoding loop based on some sort of prediction. The depth picture decoding loop may be identical to the texture picture decoding loop. In phase 156, a depth element may be filtered based on the texture encoding parameters formed in phase 152. The filtering may happen inside the decoding loop e.g. in a loop filter. The filtering may be carried out to smooth and correct depth information so that it corresponds better to the appropriate (in terms of visual appearance) depth information associated with the texture pictures. The filtering in phase 156 may be identical to the filtering of phase 116 in FIG. 1a, or it may produce identical or perceivably identical or approximately same results as the filtering in phase 116.

Figure 2B:
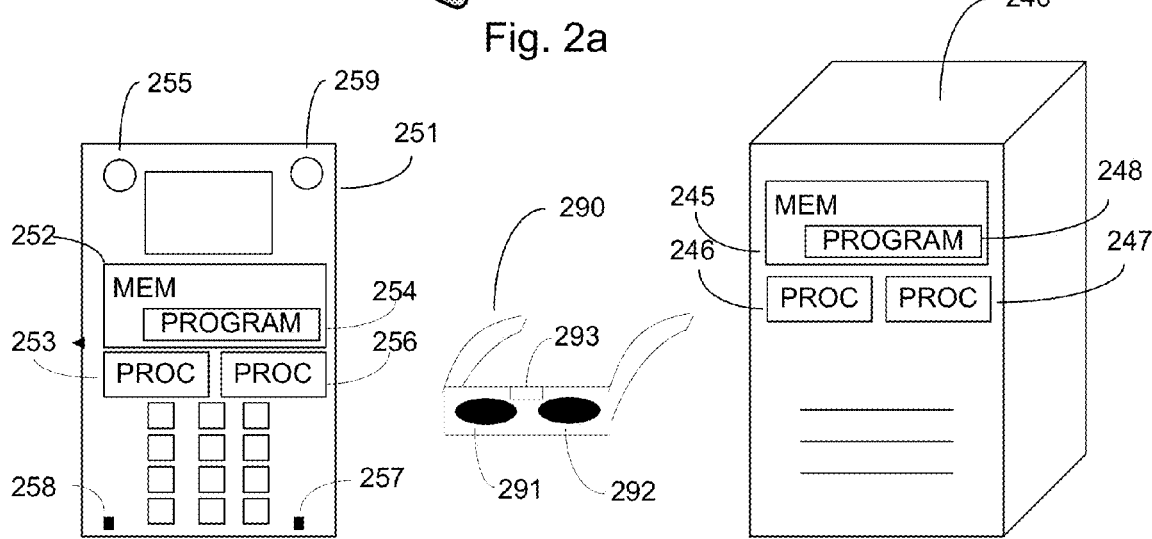

FIGS. 2a and 2b show a system and devices for encoding and decoding depth information in a multi-view video system according to an embodiment. In FIG. 2a, the different devices may be connected via a fixed network 210 such as the Internet or a local area network; or a mobile communication network 220 such as the Global System for Mobile communications (GSM) network, 3rd Generation (3G) network, 3.5th Generation (3.5G) network, 4th Generation (4G) network, Wireless Local Area Network (WLAN), Bluetooth®, or other contemporary and future networks. Different networks are connected to each other by means of a communication interface 280. The networks comprise network elements such as routers and switches to handle data (not shown), and communication interfaces such as the base stations 230 and 231 in order for providing access for the different devices to the network, and the base stations 230, 231 are themselves connected to the mobile network 220 via a fixed connection 276 or a wireless connection 277.

There may be a number of servers connected to the network, and in the example of FIG. 2a are shown a server 240 for offering a network service for providing multi-view (e.g. 3D) video and connected to the fixed network 210, a server 241 for storing multi-view video in the network and connected to the fixed network 210, and a server 242 for offering a network service for providing multi-view video and connected to the mobile network 220. Some of the above devices, for example the computers 240, 241, 242 may be such that they make up the Internet with the communication elements residing in the fixed network 210.

There are also a number of end-user devices such as mobile phones and smart phones 251, Internet access devices (Internet tablets) 250, personal computers 260 of various sizes and formats, televisions and other viewing devices 261, video decoders and players 262, as well as video cameras 263 and other encoders. These devices 250, 251, 260, 261, 262 and 263 can also be made of multiple parts. The various devices may be connected to the networks 210 and 220 via communication connections such as a fixed connection 270, 271, 272 and 280 to the internet, a wireless connection 273 to the internet 210, a fixed connection 275 to the mobile network 220, and a wireless connection 278, 279 and 282 to the mobile network 220. The connections 271-282 are implemented by means of communication interfaces at the respective ends of the communication connection.

FIG. 2b shows devices for encoding and decoding depth data according to an example embodiment. As shown in FIG. 2b, the server 240 contains memory 245, one or more processors 246, 247, and computer program code 248 residing in the memory 245 for implementing, for example, depth data encoding. The different servers 241, 242, 290 may contain at least these same elements for employing functionality relevant to each server. Similarly, the end-user device 251 contains memory 252, at least one processor 253 and 256, and computer program code 254 residing in the memory 252 for implementing, for example, gesture recognition. The end-user device may also have one or more cameras 255 and 259 for capturing image data, for example stereo video. The end-user device may also contain one, two or more microphones 257 and 258 for capturing sound. The different end-user devices 250, 260 may contain at least these same elements for employing functionality relevant to each device. The end user devices may also comprise a screen for viewing single-view, stereoscopic (2-view), or multiview (more-than-2-view) images. The end-user devices may also be connected to video glasses 290 e.g. by means of a communication block 293 able to receive and/or transmit information. The glasses may contain separate eye elements 291 and 292 for the left and right eye. These eye elements may either show a picture for viewing, or they may comprise a shutter functionality e.g. to block every other picture in an alternating manner to provide the two views of three-dimensional picture to the eyes, or they may comprise an orthogonal polarization filter (compared to each other), which, when connected to similar polarization realized on the screen, provide the separate views to the eyes. Other arrangements for video glasses may also be used to provide stereoscopic viewing capability. Stereoscopic or multiview screens may also be autostereoscopic, i.e. the screen may comprise or may be overlaid by an optical arrangement which results into a different view being perceived by each eye. Single-view, stereoscopic, and multiview screens may also be operationally connected to viewer tracking such a manner that the displayed views depend on viewer's position, distance, and/or direction of gaze relative to the screen. For example, the viewer's distance from the screen may affect the separation of images for the left and right eye to form an image that is pleasing and comfortable to view.

It needs to be understood that different embodiments allow different parts to be carried out in different elements. For example, encoding and decoding of video may be carried out entirely in one user device like 250, 251 or 260, or in one server device 240, 241, 242 or 290, or across multiple user devices 250, 251, 260 or across multiple network devices 240, 241, 242, 290, or across both user devices 250, 251, 260 and network devices 240, 241, 242, 290. For example, different views of the video may be stored in one device, the encoding of a stereo video for transmission to a user may happen in another device and the packetization may be carried out in a third device. As another example, the video stream may be received in one device, and decoded, and decoded video may be used in a second device to show a stereo video to the user. The video coding elements may be implemented as a software component residing on one device or distributed across several devices, as mentioned above, for example so that the devices form a so-called cloud.

The different embodiments may be implemented as software running on mobile devices and optionally on services. The mobile phones may be equipped at least with a memory, processor, display, keypad, motion detector hardware, and communication means such as 2G, 3G, WLAN, or other. The different devices may have hardware like a touch screen (single-touch or multi-touch) and means for positioning like network positioning or a global positioning system (GPS) module. There may be various applications on the devices such as a calendar application, a contacts application, a map application, a messaging application, a browser application, a gallery application, a video player application and various other applications for office and/or private use.

View synthesis algorithms are mostly based on the image wrapping and may be sensitive for the quality of the depth map data. The quality of available depth data may vary, as the depth data is usually a result of estimation procedure based on stereo correspondences or outcome of a noisy and low-resolution range sensor. In order to reduce the impact of noise on the compression stage and impact of artifacts on the view synthesis, it may be desirable to perform filtering/denoising of the depth map data as a pre-processing step before encoding.

Various filtering approaches may be used to enhance depth maps obtained by depth estimation prior to encoding of the depth maps. One method may be based on edge and motion-adaptive median filtering. To enforce the spatial, temporal and inter-view coherence in the multiview depth maps, the median filtering is applied to 4-dimensional windows that consist of the spatially neighboring depth map values taken at different viewpoints and time instants. These windows may have locally adaptive shapes in a presence of edges or motion to preserve sharpness and realistic rendering. Restoration algorithms for depth maps, which utilize structural information retrieved from the color channel, may also be used. Such restoration algorithms may be useful in denoising the depth map.

Depth map compression may be performed with standard hybrid video coding algorithms, e.g. H.264/AVC or MVC, which may not be optimized for depth data characteristics and may introduce coding artifacts to the reconstructed depth data. Transform—motion compensation hybrid video coding for depth maps may not be able to represent sharp object boundaries accurately and without artifacts, such as ringing. Moreover, a rate-distortion optimized mode selection may be used, which may result in a relatively frequent use of skip mode and not-coded residual blocks. While the coded bitstream is rate-distortion-optimal in terms of depth peak signal-to-noise ratio (PSNR), the depth images may suffer from false vertical and horizontal edges and consequently the view synthesis result may become suboptimal.

Figure 3A:
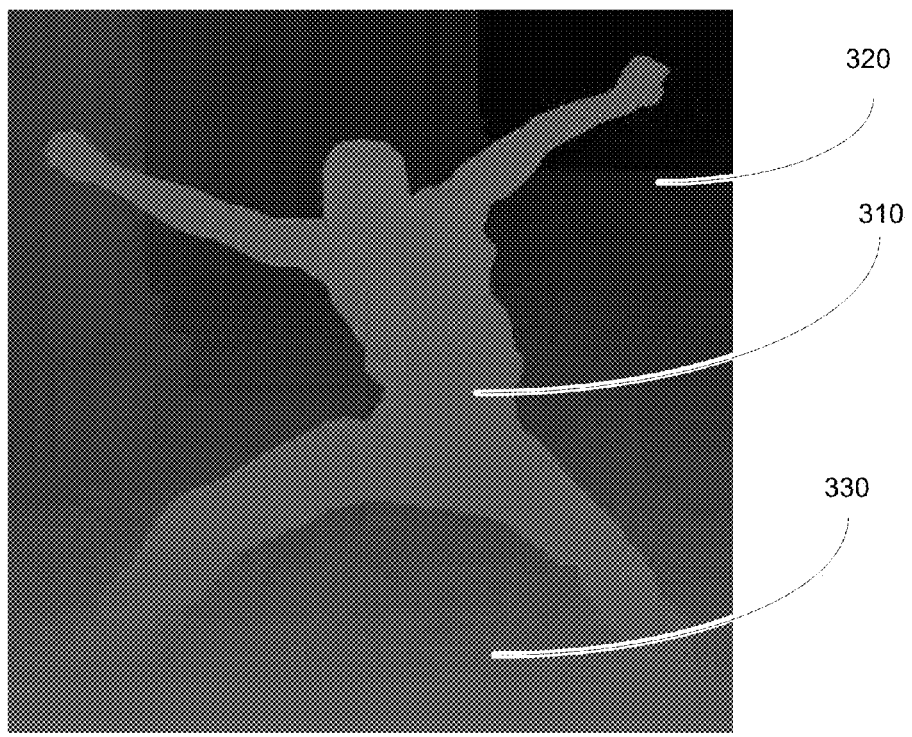
FIGS. 3a and 3b show examples of encoded depth images.
Figure 3B:
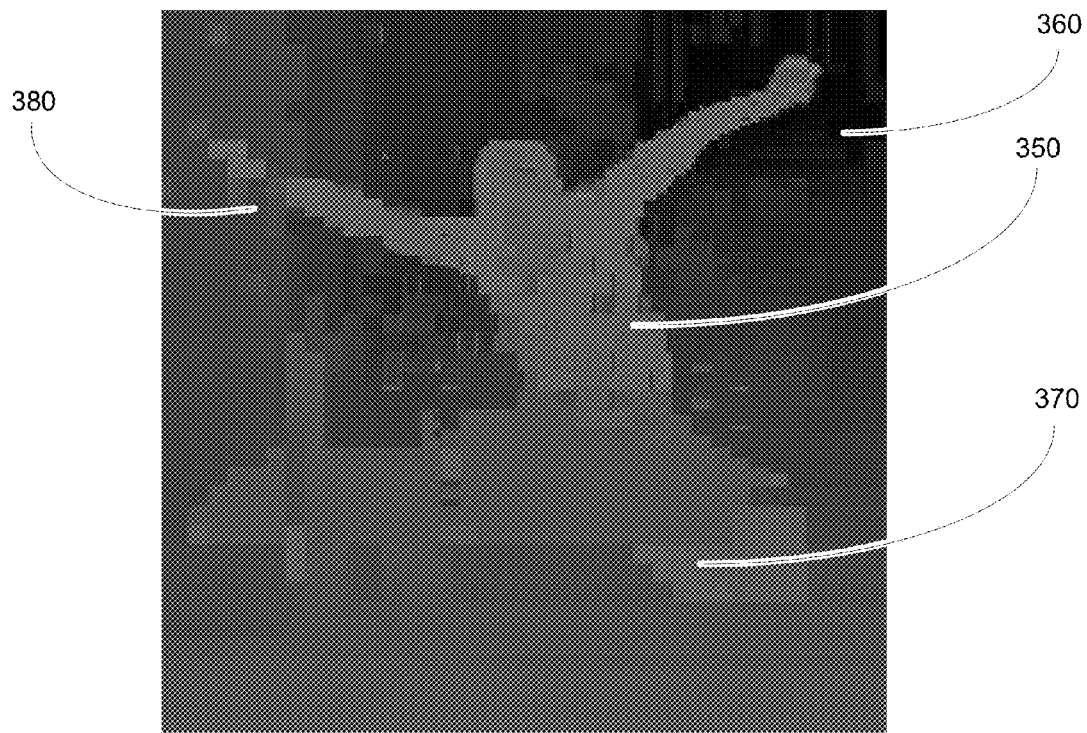

FIGS. 3a and 3b show two examples of coding errors for depth maps. A dancer video sequence is used in the examples. The sequence is synthetically created and hence the depth map sequences do not contain any noise or incorrect depth values. In FIGS. 3a and 3b, quantization parameter (QP) equal to 34 and 50, respectively, have been used to code the dancer depth map sequence with a standard H.264/AVC encoder and the standard deblocking loop filter turned on. A close-up of the hundredth decoded frame for of the respective bitstreams is displayed below. Blocking, false edges, and incorrect depth values are visible in both example images, while they are naturally more adverse in the case of QP50 in FIG. 3b. The far background 320 and 360 is encoded fairly well in both cases. The close background 330 and 370 may blend with the dancer and show heavy blocking artifacts. The dancer FIGS. 310 and 350 is rather uniform, but especially the FIG. 350 shows blocking an blending with the background, e.g. in the area 380 of the hand.

Such errors may alter the depth experience of displayed multi-view video when one or more views are synthesized from texture and depth data, and even alter the texture of the synthesized views of the multi-view video, if the disparity range of the video pictures is adjusted by copying background data to locations where foreground objects are moved from. This may, in an extreme case, even cause a foreground object like a human face to be replaced by a background pattern like the sky. The embodiments described in this application may alleviate these problems in encoding the depth image. For example, the system may detect a face or another foreground area with even depth information from the texture encoding. Strong in-loop filtering of depth data may be applied within detected objects to smooth undesirable noise or coding artifacts In another example, system may derive or adapt the shape, directionality, pulse or frequency response, weights or window function, and/or other parameters of the filter.

The depth filtering may be applied in the coding loop or as a post-filter. The joint filtering of texture and depth map may allow to achieve better quality of the synthesized views. The structural information retrieved from the color channel may be utilized to provide better suppression of coding artifacts and better preservation of details in the depth map data in comparison with conventional approaches. Alternatively or in addition, utilization of proposed invention for depth map coding may allow stronger quantization and/or better data compression efficiency with the same quality of synthesized views.

Figure 4:
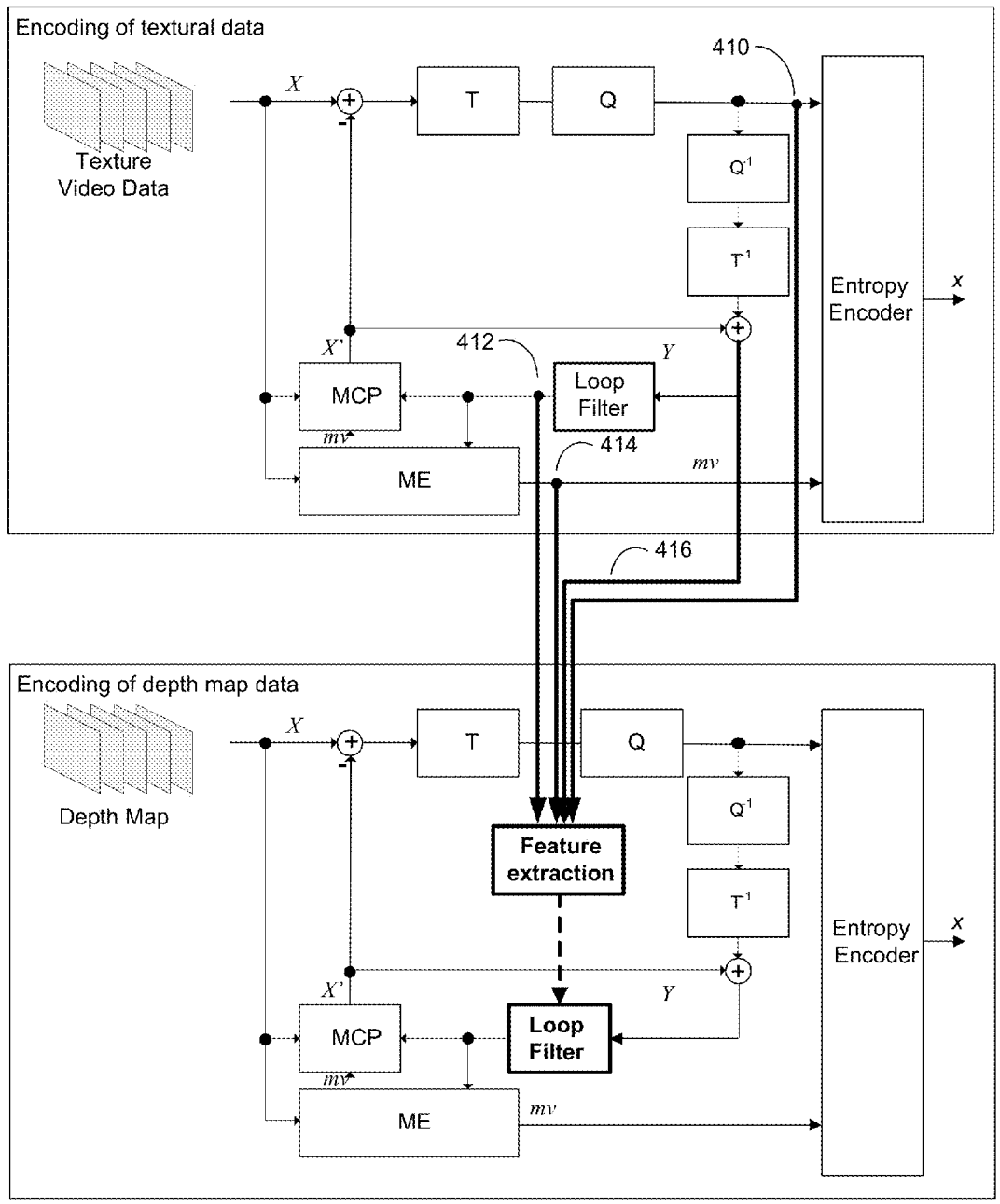
FIG. 4 shows a block diagram for a method and a device for encoding depth information in a coding loop according to an embodiment.

FIG. 4 shows a block diagram for a method and a device for encoding depth information in a coding loop according to an embodiment. In the figure, joint texture-depth map filtering within a coding loop of compression algorithms, for example within H.264/AVC or MVC coding loops is shown. In a joint texture-depth map filtering approach, the filtering of depth images may be applied in the coding loop. In this approach, edge-preserving structural information extracted from the textural/color information may be used to configure the filtering operations over the depth map data. The filtered depth images may be stored as reference pictures for inter and inter-view prediction of other depth images. The embodiments may be realized in hybrid video coding schemes, e.g. within H.264/AVC, MVC or future video coding standard which is based on hybrid video coding approach or any other coding approach where inter prediction (also known as motion estimation and motion compensation) is used. Identical or approximately identical joint texture/depth map filtering may be implemented at the decoder side. Alternatively, the decoder may implement another joint texture/depth map filtering that produces identical or close to identical results compared to the encoder filter. This may prevent propagation of prediction loop error in the depth map images.

FIG. 4 comprises a coding loop for encoding textural data and a coding loop for encoding depth map data. In the texture coding loop (top loop), texture video data X is input to the encoder. The texture video data may be multi-view video data such as stereo video for 3D video viewing. In the encoder, the video data X is input to a motion compensation prediction block MCP and a motion estimation block ME for use in prediction. Together, these blocks create a prediction X' for the next video frame. Motion estimation information (motion vectors) are also sent to the entropy encoder.

This predicted data X' is subtracted from the input video (block by block), and the residual error is then transformed in block T, for example with discrete cosine transform, and quantized. The transformed and quantized (block Q) residual error is one input to the entropy encoder. The transformed and quantized residual error from point 410 may be used as input to controlling the loop filter of depth map coding. The transformed and quantized residual error is then dequantized (block $Q^{-1}$) and an inverse transform is applied (block $T^{-1}$).

Predicted data X' is then added to this residual error, and a loop filter is applied e.g. to reduce blocking artifacts. The loop filtered image is then given to the ME and MCP blocks as input for the prediction of the next image. The loop filtered image at point 412 and motion estimation information at point 414 may be given to the feature extractor as input. In some embodiments, the image 416 prior to loop filtering may be given to the feature extractor as input in addition to or instead of the loop filtered image. The entropy encoder encodes the residual error data and the motion estimation data in an efficient manner e.g. by applying variable-length coding. The encoded data may be transmitted to a decoder or stored for playback, for example.

The encoding of depth map data happens in a coding loop with similar elements than the one for texture video data. The depth map data X undergoes motion estimation ME and motion compensation prediction MCP, the residual error is transformed and quantized, dequantized and inverse transformed, and finally loop filtered. The loop filter, or another filter such as a post-filter or a pre-filter, is adapted and/or controlled by using parameters and features from the texture encoding points 410, 412 and 414, and/or others. A feature extractor may be used to extract features. The feature extractor may be a separate block, or it may be a block in the texture coding loop, or it may be a block in the depth map coding loop. The loop filter provides a smoother depth map (after transform T, quantization Q, dequantization $Q^{-1}$ and inverse transform $T^{-1}$) that may serve as a better basis for motion compensation prediction. The depth map information (residual error and motion estimation information) are sent to the entropy encoder. The encoded data may be transmitted to a decoder or stored for playback, for example.

Feature extraction may be performed after the coding/decoding of a texture picture or after coding/decoding a part of a texture picture, such as a slice or a macroblock. Similarly, joint texture/depth map filtering may be done after coding/decoding a depth picture or a part of it, such as a slice or a macroblock. Feature extraction in smaller units than a picture enables parallelization of texture picture and depth picture coding/decoding. Joint texture/depth map filtering facilitates parallel processing and enables the use of filtered picture areas for intra prediction.

The main modules of the various embodiments may be realized through various feature extraction and filtering algorithms. The approach may comprise e.g. two main modules: feature extraction and loop filter.

Feature Extraction

A Feature Extraction or Segmentation module extracts structural (shape, edge etc.) information from the textural/color channel and produces control information for the loop filter to be applied over the depth map data. Control information may comprise position and shape of edges, location, size and shape of objects, colour information, number of objects etc.

Examples of feature extraction methods that may be applied to texture images may be:
1. ICI—"Intersection of Confidence Intervals", a directional, statistical criterion which is used to find optimal scale (processing window sizes) in given direction,
2. A k-means algorithm which is utilized to group similar neighborhoods into clusters, and
3. Image segmentation algorithms, for example: Histogram-based, Edge detection, Region growing methods, Graph partitioning or Model based segmentation algorithms.

In addition or instead of structural information extracted from decoded texture pictures, control information sent to the loop may comprise coding information, e.g. quantization parameters, macroblock coding mode, macroblock partitioning, skip information, coded block pattern, motion prediction information and others. Such pieces of control information are typically extracted in the encoding process or from the coded bitstream and may not need to be extracted from the decoded pictures. In addition to coding information of a texture picture, similar coding information of the depth picture being coded or decoded may be used as control information. The coding information may be aligned with the coding structures of the picture, such as macroblock partitioning.

In addition or instead of structural information extracted from the decoded texture picture and coding information extracted from the texture picture and/or the depth picture, structural information and/or coding information from other views of the same multiview video may be extracted or used in filtering. For example, a depth picture from an adjacent view at the same time instant may be used as a source for structural information. When structural information and/or coding information of a certain spatial location from another view is used, the spatial correspondence in the view being coded or decoded may be determined. This determination may be based on known or indicated camera separation, known or indicated global disparity between two views, view synthesis of a texture and/or depth view the view being coded or decoded based on at least the depth of the another view, and/or other methods.

Loop Filter

The loop filter may be an adaptive filter which performs filtering according to the control information from Feature Extraction module, or using information directly from the texture encoding loop (bypassing or passing-through the FE module). Some examples of filter implementations are given below:

1. LPA—Local Polynomial Approximation.

Anisotropic local polynomial approximation (LPA) is a point-wise approach for signal estimation in noisy conditions. For every sample of the signal, local polynomial estimates are fitted for different directions with a different scale.

Local estimates may be performed for 1D signal windows running from filtered sample in four (by 90 degrees) or eight (by 45 degrees) different directions. The scale of each estimate (length of window) is adjusted to meet the compromise between the accuracy of polynomial model and strength of the smoothing. As an example implementation, so-called Intersection of Confidence Intervals (ICI) statistical rule can be used to find the optimal scale for each direction.

In various example embodiments, LPA filtering may be applied to the reconstructed depth map images. However, in contrast to where ICI rule estimates the optimal scale from the processed image, in an example embodiment, the optimal scales may be estimated with a multi-hypothesis approach, from reconstructed depth and texture image(s), and/or coding information (block partitions, motion vectors or coding modes) to be utilized in the determination of the appropriate scale.

2. Multilateral Filtering

Bilateral filtering may be described as a simple non-linear edge-preserving smoothing technique. The value at each image sample is replaced by a weighted average of intensity values from nearby samples. In contrast to traditional techniques, the weight function of a bilateral filter may be computed as a combination of geometric weights (according to Euclidean distance between image samples) and photometric weights (according to the difference in the intensity between neighboring samples).

$$w[q]=wg[q-x]*wp[f(q)-f(x)], \qquad \text{i.}$$

In the equation above, the term (q−x) is Euclidian distance between the filtered (q) and contributing (x) samples and the term f(q)−f (x) is intensity (magnitude) difference between these two samples, and wg and wp are weighting functions for the same, respectively.

Multilateral filtering may be described as an extension of the bilateral filtering toward the third or more domains. For example, multilateral filter may operate simultaneously in three or more dimensions: domain filtering, range filtering, and K-dimensional feature filtering for K>1.

In various example embodiments, the multilateral filter weight function may comprise the geometric and photometric weights computed from reconstructed texture image(s) and/or weights computed with usage of some coding information (e.g. block partitions, motion vectors or coding modes) in addition to the traditional geometric and photometric weights computed from currently processed depth map image:

$$w[q]=\alpha*w1*w2*w3+\beta,$$

where w1=wg[q−x]*wp[f(q)−f (x)] is a weight computed from current depth map image, w2=wg[q−x]*wp[f(q)−f (x)] is a weight computed from image samples of reconstructed texture image(s), w3 is a weight computed from coding information and {α, β} are some arbitrary system parameters. In this manner, different aspects of the texture pictures being coded and their features and the respective coding parameters may be taken into account in the control of the depth coding loop.

3. Adaptive Wiener Filtering

Adaptive Wiener filtering may be described to belong to a class of Least Mean Squares (LMS) adaptive algorithms, and its filter coefficients may be understood to be optimal in terms of achieving the least mean squares of the error between the original (reference) and reconstructed signals. Adaptive filter coefficients may be calculated by the encoder and transmitted to the decoder side, or pre-stored at the decoder in advance. In various embodiments related to the current invention, some parameters of adaptive Wiener filter applied in a loop to a depth map image, such as tap-length, directionality, shape and/or filter coefficients set may be adapted with information extracted from reconstructed texture image(s), and/or coding information (block partitions, motion vectors or coding modes).

4. Non-Linear Adaptive Filtering

A deblocking filter utilized in the H.264 video compression coding loop may be understood to be an example of a non-linear adaptive filter. The filter may be utilized to reduce blocking artifacts in a reconstructed image and to avoid smoothing of real signal discontinuities at the same time. To achieve this, the filter strength may be computed as a function of coding parameters (quantization) and local characteristics of the reconstructed image.

In various example embodiments, the parameters of the filter applied to a reconstructed depth map image may be adapted with information extracted from reconstructed texture image(s), and/or coding information (block partitions, motion vectors or coding modes). Among filter characteristics adapted in this way may be the filter mode, smoothing strength, the adaptation functions, applicability of filters (on/off switch), and/or other parameters of the filter.

5. Adaptive Transform Based Filtering

Suppression of coding artifacts (blocking, ringing) and image restoration may be successfully performed in transform domain (e.g. in DCT, DFT or wavelet domains) due to decorrelation properties of transforms. Highly correlated video data may be compactly represented by just a few low-frequency basis functions of a transform. In contrast, the coding artifacts, such as blocking and ringing are typically represented with a high-frequency basis functions of transform. Thus original image data and coding artifacts may be separated and processed independently in a transform domain.

In various embodiments related to the current invention, the parameters of the transform-based filter applied in a loop to a reconstructed depth map image can be adapted with information extracted from reconstructed texture image(s), and/or coding information (block partitions, motion vectors or coding modes). Among filter characteristics adapted in this way may be the filter frequency response, threshold values, pulse or frequency response, applicability range in frequency domain, and/or other parameters of transform based filter.

6. Adaptive Filtering for Downsampling/Upsampling

In various depth-enhanced video coding systems, depth map image may be downsampled/decimated prior to encoding, in order to improve the compression efficiency of the system. In this case, the reconstructed image may be upsampled either in the coding loop or in the post-processing stage at the decoder. In order to achieve high quality resolution conversion, adaptive filtering may be utilized at the downsampling (anti-aliasing filtering) and at the upsampling stage (interpolation filtering).

In various example embodiments, the parameters of interpolation and/or anti-aliasing filters applied in a loop or in post-processing stage to a reconstructed depth map image can be adapted with information extracted from reconstructed texture image(s), and/or coding information (block partitions, motion vectors or coding modes). Among filter characteristics adapted in this way may be the pulse or frequency response of filter(s), filter coefficients set(s), the adaptation functions, applicability of filters (on/off switch) and/or other parameters.

In various example embodiments, an encoder may receive a texture image and a respective depth image that are of different spatial resolutions (in terms of number of samples horizontally and/or vertically). An encoder may also downsample/upsample one of the texture image and the respective depth image to be of different spatial resolutions. An encoder may apply adaptive filtering for downsampling/upsampling one of the texture image and the respective depth image. A decoder may receive a bitstream containing a coded texture image and a respective coded depth image that are of different spatial resolutions. A decoder may apply adaptive filtering for upsampling or downsampling one of the texture image and the respective depth image.

In various example embodiments, an encoder may receive or apply downsampling/upsampling to obtain a depth image and a time-aligned or otherwise respective depth image of another view that are of different spatial resolutions. An encoder may apply adaptive filtering in the mentioned downsampling/upsampling. A decoder may receive a bitstream containing a coded depth image of one view and a respective coded depth image of another view that are of different spatial resolutions. A decoder may apply adaptive filtering for upsampling or downsampling one of the decoded depth images resulting from decoding of the mentioned coded depth images. Inter-view prediction from a decoded/reconstructed depth image of a reference view may be applied when coding or decoding a depth image in another view. When inter-view prediction is applied, downsampling or upsampling of the decoded/reconstructed image in the reference view may be applied and adaptive filtering may be used in the mentioned downsampling or upsampling. The parameters of interpolation and/or anti-aliasing filters for downsampling and/or upsampling may be adapted with information extracted from decoded/reconstructed texture image(s), decoded/reconstructed depth image(s) of other view(s), and/or coding information (block partitions, motion vectors or coding modes) of texture image(s) and/or depth image(s) of other view(s).

The control information resulting from the feature extraction may be used to determine or adapt the shape, directionality, pulse or frequency response, filter coefficients set(s), weights or window function, applicability of filters (on/off switch), and/or other parameters of the filter.

Figure 5:
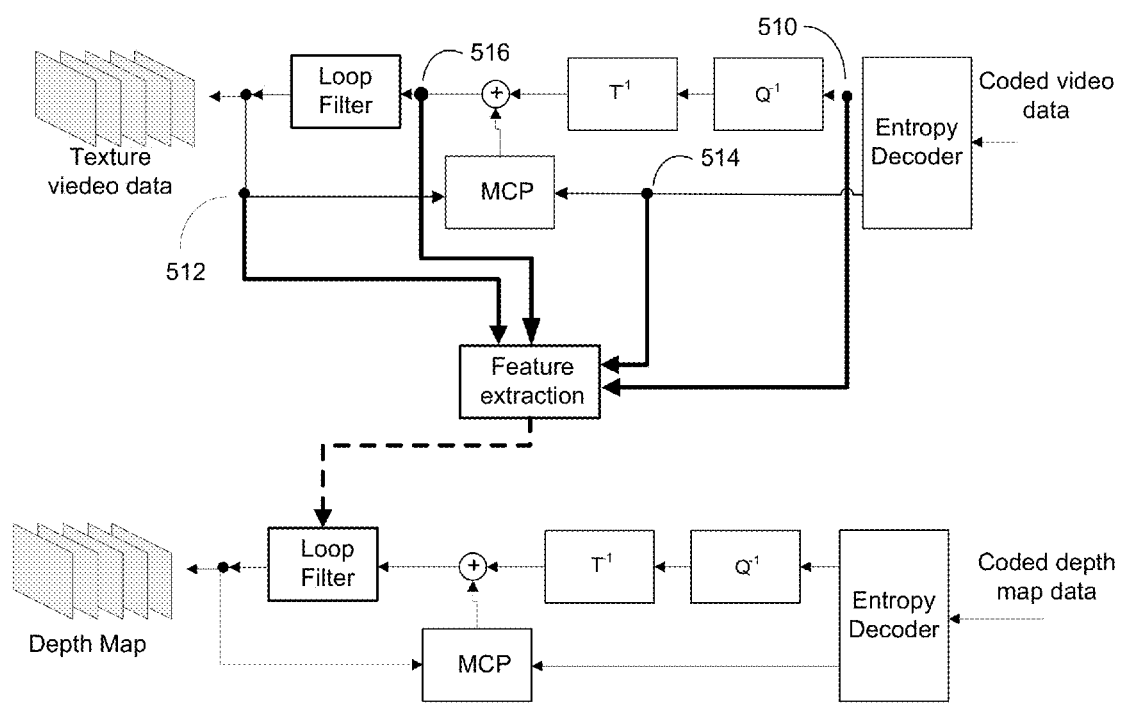
FIG. 5 shows a block diagram for a method and a device for decoding depth information in a coding loop according to an embodiment.

FIG. 5 shows a block diagram for a method and a device for decoding depth information in a coding loop according to an embodiment. The decoder comprises two decoding loops: one for the texture data and one for the depth map data. The decoding loops may be separate or they may be implemented with the same physical and/or software means.

The decoder receives coded video data (from the right), that it then passes to the entropy decoder. The entropy decoder decodes residual error information and motion compensation information from the video stream. The motion compensation information is used to create a prediction of the image by using earlier decoded images as reference. The residual error information is dequantized (block $Q^{-1}$) and inverse transformed (block $T^{-1}$), and added to the prediction data. After this, the image undergoes loop filtering to reduce artifacts, and is then ready to be outputted, as well as used for reference in decoding later images. Again, data from the texture decoding, such as the residual error at point 510, the motion estimation information at point 514 and the decoded image at point 512 may be used as input to controlling the filtering in the depth map decoding. In some embodiments, the image at point 516 prior to loop filtering may be given to the feature extractor as input in addition to or instead of the loop filtered image.

The decoding of depth map data happens in a coding loop with similar elements than the one for texture video data. The coded depth map data is decoded in the entropy decoder, fed into the motion compensation prediction block and the dequantizer ($Q^{-1}$) and the inverse transformer ($T^{-1}$), to obtain a depth map image. The depth map image or depth map data thus obtained undergoes filtering before output, e.g. in a loop filter.

The loop filter, or another filter such as a post-filter, is adapted and/or controlled by using parameters and features from the texture decoding points 510, 512 and 514, and/or others. A feature extractor may be used to extract features. The feature extractor may be a separate block, or it may be a block in the texture coding loop, or it may be a block in the depth map coding loop. The loop filter provides a smoother depth map that may be close or the same as the depth map used for motion compensation prediction on the encoder side. This similarity or approximate similarity may help prevent depth map error propagation, as explained earlier.

Figure 6:
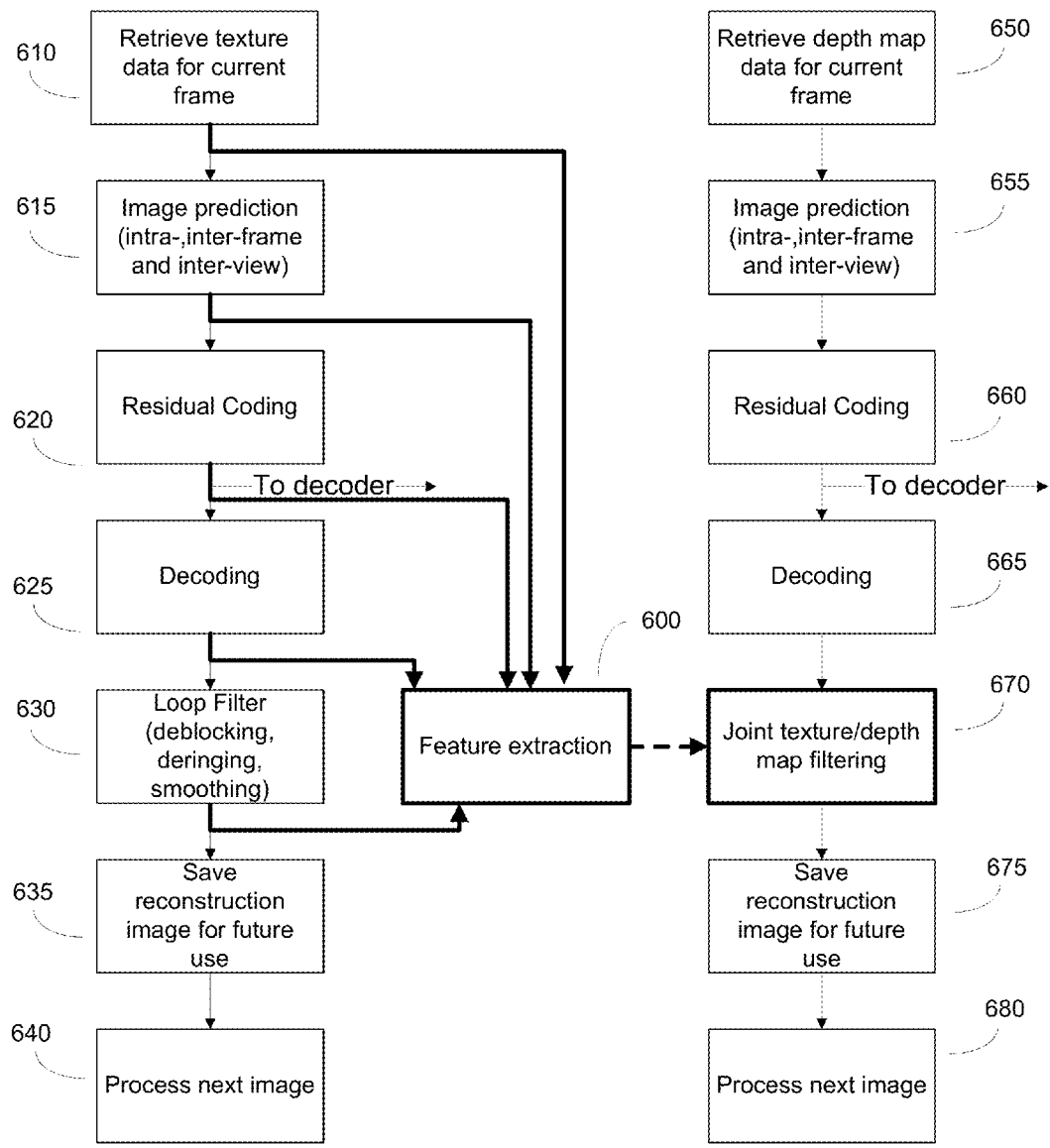
FIG. 6 shows a flow chart for coding depth information with joint texture and depth filtering according to an embodiment.

FIG. 6 shows a flow chart for coding depth information with joint texture and depth filtering according to an embodiment. In phase 610, texture data for current frame is retrieved. In phase 615, image prediction is applied. Image prediction may be intra-frame prediction, inter-frame prediction and inter-view prediction, and other. Image prediction need not be limited to a single prediction source, but so-called multi-hypothesis prediction, such as bi-prediction of H.264/AVC may be used. The prediction error residual is then encoded in phase 620. Decoded texture data is reconstructed in phase 625 by summing up the prediction and residual, for instance. The loop filter is applied to the decoded image in phase 630. In phase 635, the image is saved for future use, e.g. as a reference picture. Then, the next image is processed (640).

In phase 650, depth map data for current frame is retrieved. In phase 655, image prediction is applied. Image prediction may be intra-frame prediction, inter-frame prediction and inter-view prediction, and other. Image prediction need not be limited to a single prediction source, but so-called multi-hypothesis prediction, such as bi-prediction of H.264/AVC may be used. The prediction error residual is then encoded in phase 660. Decoded depth data is reconstructed in phase 665 by summing up the prediction and residual, for instance. The loop filter is applied to the decoded image in phase 670. In phase 675, the image is saved for future use, e.g. as a reference picture. Then, the next image is processed (680). From the various phases of the texture encoding, parameters, data and control signals may be taken to control and feed the feature extraction at phase 600 and thereby the depth map filtering at phase 670.

In the various embodiments described above, features for controlling depth map filtering may also be included in the coded texture or depth data or sent by other means from the encoder to the decoder. For example, including in the bitstream or sending characteristics of the range of segmentation may speed up the operation of the filter control on the decoder side. The encoder may include in the bitstream or send an indication of maximum object size to the decoder, whereby the segmentation algorithm in the feature extractor of the decoder may know to stop segmentation of an object when it has reached a certain size. As another example, the encoder may include in the bitstream or send average color values of texture objects in the picture so that the feature extractor and/or depth map filter may recognize the objects faster. As one more example, the encoder may produce/estimate and include in the bitstream or otherwise send intensity ranges for filter applicability, locations, shapes etc. other information on objects for segmentation.

In the various embodiments described above, features for controlling depth map filtering may also be produced/estimated at the decoder side. For example, estimating characteristics of the range of segmentation may speed up the operation of the filter control on the decoder side. The decoder may derive indication of a maximum object size and store it for further use, whereby the segmentation algorithm in the feature extractor of the decoder may know to stop segmentation of an object when it has reached a certain size. As another example, the decoder may produce/estimate average color values of texture objects in the picture and store it for further use so that the feature extractor and/or depth map filter may recognize the objects faster. As one more example, the decoder may produce/estimate and utilize for further use intensity ranges for filter applicability, locations, shapes etc. other information on objects for segmentation.

As it is shown in the image, texture and depth map data may be processed in parallel. However, a reconstructed texture image produced by the decoder or some information derived from texture image decoding (partitions, coding mode and other) undergoes feature extraction, which produces control information for the joint texture/depth map data filter. The parallel processing flow may be transformed into the sequential flow graph by saving the control information and starting the depth map processing after step 635 for texture channel is done. In many embodiments, the coding or decoding of a coding element, such as a macroblock, of a texture picture must be completed before applying the feature extraction for that coding element and coding or decoding the respective coding element of the respective depth picture. Hence, the depth picture may be processed in parallel with the texture picture having a delay of essentially one coding element. In some embodiments, the feature extraction process may require more than one coding element being considered for a single coding element in a depth picture, and hence the delay in parallel processing may be larger than one coding element. The required delay in terms of number of coding elements or a similar measure may be included in the coded video or depth data or sent by other means from the encoder to the decoder. In some embodiments, the required delay is included in a Supplemental Enhancement Information message created by the encoder or a bitstream analyzer.

The various embodiments may provide advantages over state of the art. For example, the joint texture/depth map filtering may improve the coding efficiency of existing coding algorithms applied for depth map data coding. The joint depth map filtering may improve the operation of the loop filter for the processing of depth data. Further, the embodiments may improve the quality of synthesized views for 3D Video Systems. A potential complexity increase may be compensated by reusing/replacing of a deblocking loop filter as/with a joint texture-depth-aware filter. In various embodiments, disparity maps or disparity information may be used instead of or in addition to depth maps or depth information. Disparity may be defined as the difference of the horizontal coordinates of the respective pixel in two texture views. A disparity map may be coded similarly to a depth map according to various embodiments. Disparity may generally be converted to depth and utilized for view synthesis.

The various embodiments of the invention can be implemented with the help of computer program code that resides in a memory and causes the relevant apparatuses to carry out the invention. For example, a terminal device may comprise circuitry and electronics for handling, receiving and transmitting data, computer program code in a memory, and a processor that, when running the computer program code, causes the terminal device to carry out the features of an embodiment. Yet further, a network device may comprise circuitry and electronics for handling, receiving and transmitting data, computer program code in a memory, and a processor that, when running the computer program code, causes the network device to carry out the features of an embodiment. The various devices may be or may comprise encoders, decoders and transcoders, packetizers and depacketizers, and transmitters and receivers.

It is obvious that the present invention is not limited solely to the above-presented embodiments, but it can be modified within the scope of the appended claims.

What is claimed is:

1. A method for encoding picture data, the method comprising:
    encoding at least one texture element of said picture data to obtain at least one encoded texture element,
    forming at least one texture encoding parameter in said encoding,
    encoding at least one depth element associated with said at least one texture element to obtain at least one encoded depth element,
    applying filtering to depth data in said encoding of at least one depth element, wherein the filtering is loop filtering, and
    controlling said filtering using said at least one texture encoding parameter.

2. A method according to claim 1, further comprising:
    encoding said at least one texture element in a texture coding loop,
    encoding said at least one depth element in a depth coding loop,
    applying said filtering to depth data in a loop filter of said depth coding loop, and
    forming said coded texture element and said coded depth element into at least one bitstream.

3. A method according to claim 1, further comprising:
    reconstructing encoded depth data of at least one other depth element, and
    using said reconstructed depth data as a prediction source in encoding of said at least one depth element.

4. A method according to claim 1, further comprising:
reconstructing at least part of an image using said at least one encoded texture element,
extracting a feature from said at least part of an image using image feature extraction, and
controlling said filtering using said feature.

5. A method according to claim 1, wherein said at least one texture encoding parameter is indicative of at least one of the group of an encoding process, a filtering process, a prediction process, a transform process, a quantization process, a feature of a picture, a coded texture element and a non-coded texture element.

6. A method according to claim 1, the method further comprising
increasing a sample count of the at least one depth element by resampling in said filtering to obtain at least one upsampled depth element, and
encoding said at least one upsampled depth element to obtain at least one encoded depth element.

7. An apparatus comprising at least one processor, and memory including computer program code, the memory and the computer program code configured to, with the at least one processor, cause the apparatus to at least:
encode at least one texture element of said picture data to obtain at least one encoded texture element,
form at least one texture encoding parameter in said encoding,
encode at least one depth element associated with said texture element to obtain at least one encoded depth element,
apply filtering to depth data in said encoding of at least one depth element, wherein the filtering is loop filtering, and
control said filtering using said at least one texture encoding parameter.

8. An apparatus according to claim 7, further comprising computer program code configured to, with the at least one processor, cause the apparatus to at least:
encode said at least one texture element in a texture coding loop,
encode said at least one depth element in a depth coding loop,
apply said filtering to depth data in a loop filter of said depth coding loop, and
form said coded texture element and said coded depth element into at least one bitstream.

9. An apparatus according to claim 7, further comprising computer program code configured to, with the at least one processor, cause the apparatus to at least:
reconstruct encoded depth data of at least one other depth element, and
use said reconstructed depth data as a prediction source in encoding of said at least one depth element.

10. An apparatus according to claim 7, further comprising computer program code configured to, with the at least one processor, cause the apparatus to at least:
reconstruct at least part of an image using said at least one encoded texture element,
extract a feature from said at least part of an image using image feature extraction, and
control said filtering using said feature.

11. An apparatus according to claim 7, wherein said at least one texture encoding parameter is indicative of at least one of the group of an encoding process, a filtering process, a prediction process, a transform process, a quantization process, a feature of a picture, a coded texture element and a non-coded texture element.

12. An apparatus according to claim 7, further comprising computer program code configured to, with the at least one processor, cause the apparatus to at least:
increase a sample count of the at least one depth element by resampling in said filtering to obtain at least one upsampled depth element, and
encode said at least one upsampled depth element to obtain at least one encoded depth element.

13. A method for decoding encoded depth data, the method comprising:
decoding at least one encoded texture element from encoded texture data,
forming at least one texture encoding parameter in said decoding,
decoding at least one depth element associated with said at least one texture element from said encoded depth data to obtain at least one decoded depth element,
applying filtering to said at least one decoded depth element in said decoding of at least one depth element, wherein the filtering is loop filtering, and
controlling said filtering using said at least one texture encoding parameter.

14. A method according to claim 13, further comprising:
receiving said encoded texture data and said encoded depth data in at least one bitstream,
decoding said at least one texture element in a texture coding loop,
decoding said at least one depth element in a depth coding loop, and
applying said filtering to said depth element in a loop filter of said depth coding loop.

15. A method according to claim 13, further comprising:
reconstructing encoded depth data of at least one other depth element, and
using said reconstructed depth data as a prediction source in decoding of said at least one depth element.

16. A method according to claim 13, further comprising:
reconstructing at least part of an image using said at least one texture element,
extracting a feature from said at least part of an image using image feature extraction, and
controlling said filtering using said feature.

17. A method according to claim 13, wherein said at least one texture encoding parameter is indicative of at least one of the group of a decoding process, a filtering process, a prediction process, a transform process, a quantization process, a feature of a picture, a coded texture element and a non-coded texture element.

18. A method according to claim 13, the method further comprising
increasing a sample count of at least one depth element by resampling in said filtering to obtain at least one upsampled depth element.

19. An apparatus comprising at least one processor, and memory including computer program code, the memory and the computer program code configured to, with the at least one processor, cause the apparatus to at least:
decode at least one encoded texture element from encoded texture data,
form at least one texture encoding parameter in said decoding,
decode at least one depth element associated with said at least one texture element from said encoded depth data to obtain at least one decoded depth element,
filter said at least one decoded depth element in said decoding of at least one depth element, wherein the filtering is loop filtering, and control said filtering using said at least one texture encoding parameter.

20. An apparatus according to claim 19, further comprising computer program code configured to, with the at least one processor, cause the apparatus to at least:
receive said encoded texture data and said encoded depth data in at least one bitstream,
decode said at least one texture element in a texture coding loop,
decode said at least one depth element in a depth coding loop, and
apply said filtering to said depth element in a loop filter of said depth coding loop.

21. An apparatus according to claim 19, further comprising computer program code configured to, with the at least one processor, cause the apparatus to at least:
reconstruct encoded depth data of at least one other depth element, and
use said reconstructed depth data as a prediction source in decoding of said at least one depth element.

22. An apparatus according to claim 19, further comprising computer program code configured to, with the at least one processor, cause the apparatus to at least:
reconstruct at least part of an image using said at least one texture element,
extract a feature from said at least part of an image using image feature extraction, and
control said filtering using said feature.

23. An apparatus according to claim 19, wherein said at least one texture encoding parameter is indicative of at least one of the group of an encoding process, a filtering process, a prediction process, a transform process, a quantization process, a feature of a picture, a coded texture element and a non-coded texture element.

24. An apparatus according to claim 19, further comprising computer program code configured to, with the at least one processor, cause the apparatus to at least:
increase a sample count of at least one depth element by resampling in said filtering to obtain at least one upsampled depth element.

25. A method for coding picture data, the method comprising:
coding at least one texture element of said picture data,
forming at least one texture coding parameter in said coding,
coding at least one depth element associated with said at least one texture element,
applying filtering to depth data in said coding of at least one depth element, wherein the filtering is loop filtering, and
controlling said filtering using said at least one texture coding parameter.

26. A computer program embodied on a non-transitory computer readable medium, the computer program comprising instructions causing, when executed on at least one processor, at least one apparatus to:
code at least one texture element of said picture data,
form at least one texture coding parameter in said coding,
code at least one depth element associated with said at least one texture element,
apply filtering to depth data in said coding of at least one depth element, wherein the filtering is loop filtering, and
control said filtering using said at least one texture coding parameter.

27. A apparatus comprising at least one processor, and memory including computer program code, the memory and the computer program code configured to, with the at least one processor, cause the system to at least:
code at least one texture element of said picture data,
form at least one texture coding parameter in said coding,
code at least one depth element associated with said at least one texture element,
apply filtering to depth data in said coding of at least one depth element, wherein the filtering is loop filtering, and
control said filtering using said at least one texture coding parameter.

28. An apparatus comprising:
means for encoding at least one texture element of said picture data to obtain at least one encoded texture element,
means for forming at least one texture encoding parameter in said encoding,
means for encoding at least one depth element associated with said texture element to obtain at least one encoded depth element,
means for filtering depth data in said encoding of at least one depth element, wherein the filtering is loop filtering, and
means for controlling said filtering using said at least one texture encoding parameter.

29. An apparatus comprising:
means for decoding at least one encoded texture element from encoded texture data,
means for forming at least one texture encoding parameter in said decoding,
means for decoding at least one depth element associated with said at least one texture element from said encoded depth data to obtain at least one decoded depth element,
means for filtering said at least one decoded depth element in said decoding of at least one depth element, wherein the filtering is loop filtering, and
means for controlling said filtering using said at least one texture encoding parameter.

* * * * *